United States Patent
Geck et al.

(10) Patent No.: US 6,717,959 B2
(45) Date of Patent: Apr. 6, 2004

(54) METHODS AND APPARATUS FOR AUTOMATICALLY DETECTING CALL APPEARANCE VALUES FOR EACH PRIMARY DIRECTORY NUMBER ON A BASIC RATE INTERFACE

(75) Inventors: Bertram Geck, Boca Raton, FL (US); Francisco Olympio Marcon da Rocha, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 395 days.

(21) Appl. No.: 09/752,630

(22) Filed: Dec. 28, 2000

(65) Prior Publication Data

US 2002/0126825 A1 Sep. 12, 2002

(51) Int. Cl.$^7$ .................................................. H04J 3/12
(52) U.S. Cl. ........................................ 370/524; 370/352
(58) Field of Search ................................. 370/352, 524; 379/229

(56) References Cited

U.S. PATENT DOCUMENTS

| | | | | |
|---|---|---|---|---|
| 5,309,028 A | * | 5/1994 | Brown et al. | 379/201.01 |
| 5,854,829 A | * | 12/1998 | Hughes-Hartogs | 379/100.12 |
| 5,937,049 A | * | 8/1999 | Brady | 379/216.01 |

* cited by examiner

*Primary Examiner*—Ahmad F. Matar
*Assistant Examiner*—Quynh H. Nguyen

(57) ABSTRACT

Methods and apparatus for automatically configuring Call Appearance values in an ISDN BRI include providing means for one PDN to call the other PDN in the same BRI, recording the Call Appearance data for the first call, placing the first call on hold and calling the same number again, recording the Call Appearance data for the second call, and repeating the process until all Call Appearance values have been recorded. According to the invention, the process is repeated for both PDNs in each BRI coupled to customer equipment.

20 Claims, 2 Drawing Sheets

METHODS AND APPARATUS FOR AUTOMATICALLY DETECTING CALL APPEARANCE VALUES FOR EACH PRIMARY DIRECTORY NUMBER ON A BASIC RATE INTERFACE

BACKGROUND OF THE INVENTION

1. Field of the Invention

The invention relates to the Basic Rate Interface (BRI) for the Integrated Services Digital Network (ISDN). More particularly, the invention relates to methods and apparatus for automatically detecting call appearance values for each Primary Directory Number (PDN) in an ISDN BRI.

2. Brief Description of the Prior Art

The Basic Rate Interface (BRI) of ISDN service consists of two B channels, each having a bandwidth of 64 kbits/s and one D channel having a bandwidth of 16 kbits/s. Generally, each of the B channels can be used to support one voice connection or one data connection, or the two B channels can be used together to support one 128 kbits/s data connection. The D channel is used for signaling between the customer equipment (terminal equipment or TE) and the central office in order to setup, manage, and tear down connections. Each B channel is assigned a directory number (DN), i.e. a ten digit telephone number.

Two signaling protocols are used with BRI ISDN in order to establish and maintain connections: The layer 3 Q.931 protocol and the LAPD (link access protocol for the D channel). Q.931 messages are carried within an LAPD frame on the D channel. A Q.931 message includes several octets specifying protocol discriminator, length of call reference value, call reference value, message type, etc. Some of the messages sent using the Q.931 protocol include SETUP, SETUP ACKNOWLEDGE, CALL PROCEEDING, CONNECT, CONNECT ACKNOWLEDGE, RELEASE, RELEASE COMPLETE, HOLD, and HOLD ACKNOWLEDGE.

The 1999 Version of the Bellcore National ISDN BRI Terminal Equipment (TB) Generic Guidelines (SR-4620, Issue 1, December 1998) specifies guidelines for implementing man ISDN features. Among these features is a feature known as Call Appearance.

With Call Appearance, a single BRI can respond to up to 128 DNs. Moreover, customer equipment can be designated with up to 128 terminal endpoint identifiers (TEIs) each of which identifies a specific telephone or device connected to the BRI. Using Call Appearance and TEIs, each of up to 128 telephones or other devices connected to a single BRI can be provided with a separate DN. Further, each of the telephones connected to the single BRI can be configured as multiline phones responding to several DNs using electronic key telephone service (EKTS).

EKTS permits a number of illuminated keys on a telephone set to be addressed by the central office to indicate virtual additional lines. Those skilled in the art will appreciate that regardless of the number of Call Appearances, the single BRI only supports two active telephone calls at one time. More calls may be placed ❊ on hold❊ at the central office, using Q.931 signaling, but only two calls may be active at one time.

Separate Call Appearance values (0–63) are assigned to each B channel according to the service contract chosen by the customer. As mentioned above, two DNs are assigned to the BRI. This is the case when both B channels have a Call Appearance value of 0. These DNs are referred to as the primary directory numbers (PDNs). Each PDN may have a Call Appearance value other than 0 (up to 63) associated with it depending on the customer service contract. The call appearance value indicates the number of additional DNs associated with the 2 channel identified by the PDN.

As mentioned above, the Call Appearance values are in the range 0 to 63 for each B channel. The values used and the specific meaning of each Call Appearance value are defined during the ordering process in an agreement between the customer and the Central Office.

The different values are usually used to handle Central Office features (e.g. call waiting indication, voice mail message, call forwarding) and multiple calls for same B channel. In addition, choosing a special arrangement of Call Appearances and directory numbers allows a PBX to offer the equivalent of Direct Inward Dial capability over standard BRI lines.

Table 1 below illustrates an example of three BRI lines with multiple Call Appearances and shared multiple directory numbers. The main directory number for each B channel is italicized.

TABLE 1

| CA | Circuit 1 | | Circuit 2 | | Circuit 3 | |
|----|-----------|-----------|-----------|-----------|-----------|-----------|
|    | B1        | B2        | B1        | B2        | B1        | B2        |
| 01 | 555–4001  | 555–4001  | 555–4001  | 555–4001  | 555–4001  | 555–4001  |
| 02 | 555–4002  | 555–4002  | 555–4002  | 555–4002  | 555–4002  | 555–4002  |
| 03 | 555–4003  | 555–4003  | 555–4003  | 555–4003  | 555–4003  | 555–4003  |
| 04 | 555–4004  | 555–4004  | 555–4004  | 555–4004  | 555–4004  | 555–4004  |
| 05 | 555–4005  | 555–4005  | 555–4005  | 555–4005  | 555–4005  | 555–4005  |
| 06 | 555–4006  | 555–4006  | 555–4006  | 555–4006  | 555–4006  | 555–4006  |

Incoming calls for any of the six directory numbers are presented by the Central Office on all associated channels with the same Call Appearance value. In the PBX, each of the Call Appearances is assigned to a different station.

According to the state of the art, customer equipment must be manually configured with a service profile identifier (SPID) as well as the number of Call Appearances for each PDN. The correct configuration of BRI trunks and telephone equipment at the customer's premises requires specialized service engineers. The equipment must be configured for Call Appearance Call Handling (CACH) based on documentation provided by the central office. The available documentation is often not accurate or not up to date during the installation and (remote) configuration of the telephone equipment. A wrong configuration could leave trunk interfaces unusable by the customer.

The configuration of customer equipment is even more difficult when multiple BRIs are involved. For example, many PBX systems utilize multiple ISDN BRIs as an alternative to multiple individual DS1 or more expensive T1 connections. The Siemens Hicom 150 provides up to 16 BRIs through four interface cards, each of which supports four ISDN BRIs. Configuring a Hicom 150 could conceivably require configuring up to 2,048 Call Appearances (32*64).

SUMMARY OF THE INVENTION

It is therefore an object of the invention to provide methods and apparatus whereby customer equipment can be easily configured for ISDN Call Appearances.

It is also an object of the invention to provide methods and apparatus for accurately configuring customer equipment for ISDN Call Appearances.

It is another object of the invention to provide methods and apparatus for configuring customer equipment for ISDN Call Appearances without the aid of a service technician.

It is yet another object of the invention to provide methods and apparatus for quickly configuring customer equipment for ISDN Call Appearances.

It is another object of the invention to provide methods for automatically configuring call appearance values in a PBX device.

It is still another object of the invention to provide a PBX device with the capability of self-configuring call appearance values.

In accord with these objects which will be discussed in detail below, the methods according to the invention include generating a call from one PDN to the other in the same BRI circuit and monitoring the message exchange on the D channel to obtain Call Appearance information. The central office provides the first valid Call Appearance (via the D channel) to the PDN being called and this value is stored in the called PDN database.

To get all the provided Call Appearance values for each channel, the first call is placed on hold. A new call is generated from one PDN to the other in the same BRI circuit. The central office provides the second valid Call Appearance to the PDN being called and this value can also be stored in the called PDN database. This process is repeated for both channels as long as the central office offers new Call Appearance values.

The method of the invention requires only the use of standard network protocol procedures needed for standard call processing. This means that the method is not dependent of supplementary BRI services being offered by the central office that support terminal parameter downloading.

Thus, the method can be implemented in any existing or planned telephone equipment with no hardware and small software enhancement effort. The method is able to provide the Call Appearance values for BRI trunks supported by the telephone equipment, independent of the central office to which the customer's premises is connected.

The presently preferred embodiment is based on a modified Hicom 150. All of the hardware and low level software functionality needed to implement the inventive method is already available via existent function calls or via defined mailbox messages at the Device Handler, Database or Loadware level.

The new procedure is preferably located at the Device Handler and activated when the TMQ4 line card start-up is finished, layer 1 and layer 2 are up, and TEI and SPID handling are successfully accomplished. However, the methods of the invention can be implemented in virtually any ISDN customer equipment whether it be voice equipment or data equipment.

Combining the methods of the invention with known methods for determining the SPID of BRI trunks, a stand-alone test gear to identify BRI characteristics can be built.

DETAILED DESCRIPTION

Figure 1:
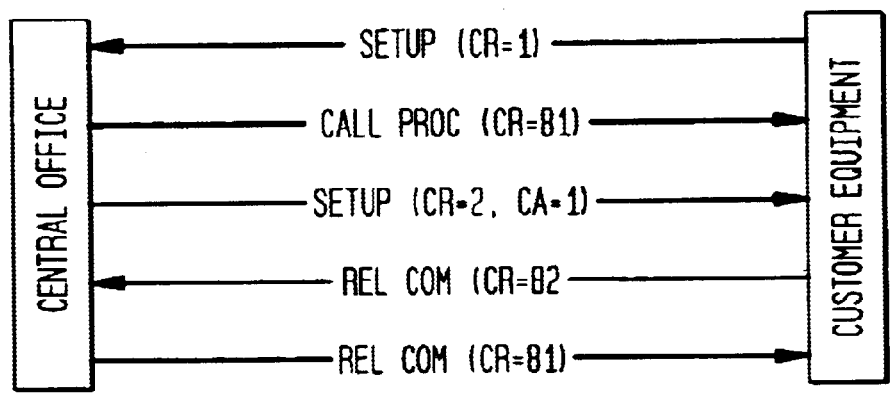
FIG. 1 is a high level flow diagram of a simple layer 3 message exchange according to the methods of the invention.

Turning now to FIG. 1, a simple layer 3 message exchange between customer equipment and the central office (CO) is illustrated whereby call appearance information is obtained during a call from PDN1 to PDN 2. A SETUP message is sent to the CO with call reference (CR) equal to 1. The CO responds with a CALL PROCEEDING message with CR=81 and a SETUP message with CR=2 and call appearance (CA) equal 1. The call is terminated by the customer equipment sending a RELEASE command with CR=82 and the CO responding with RELEASE COMPLETE with CR=81.

Figure 2:
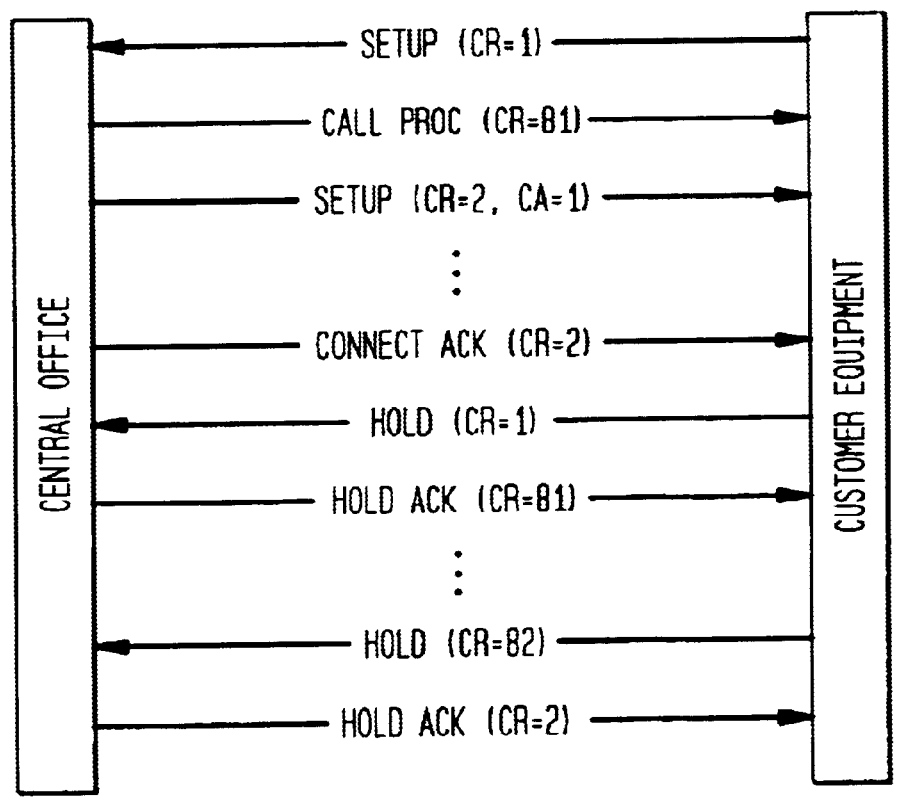
FIG. 2 is a high level flow diagram of a more elaborate layer 3 message exchange according to the methods of the invention.

The above message exchange illustrates how CA information is obtained from the CO during a single call. According to the methods of the invention, multiple calls are made to the same PDN until all CAs are obtained. FIG. 2 illustrates in a simplified manner how this is accomplished.

In the first three message exchanges in FIG. 2, a call is setup from PDN1 to PDN2 and the CA=1 is obtained. A CONNECT ACK with CR=2 is received when the PDN2 accepts the call. PDN1 then puts the first call on hold with HOLD (CR=1) message and the hold is acknowledged with the HOLD ACK (CR=81) message. Though not illustrated in FIG. 2, the PDN1 now initiates a second call to PDN2 which results in a call waiting message on the PDN2 line together with a CA value which will be stored, assuming that PDN2 has at least 2 CAs.

Upon receiving the second call, PDN2 places the first call on hold using the HOLD (CR=82) message which is acknowledged with the HOLD ACK (CR=2) message. Now that two CAs have been obtained, PDN1 will repeat the process putting the latest call on hold and initiating another call until PDN2 is unable to accept any more calls, i.e. PDN1 gets a busy signal.

After the process described above is completed with PDN1 calling PDN2, it is repeated with PDN2 calling PDN1. In the case of a PBX such as the Hicom 150, the process is repeated for each BRI coupled to the PBX.

Figure 3:
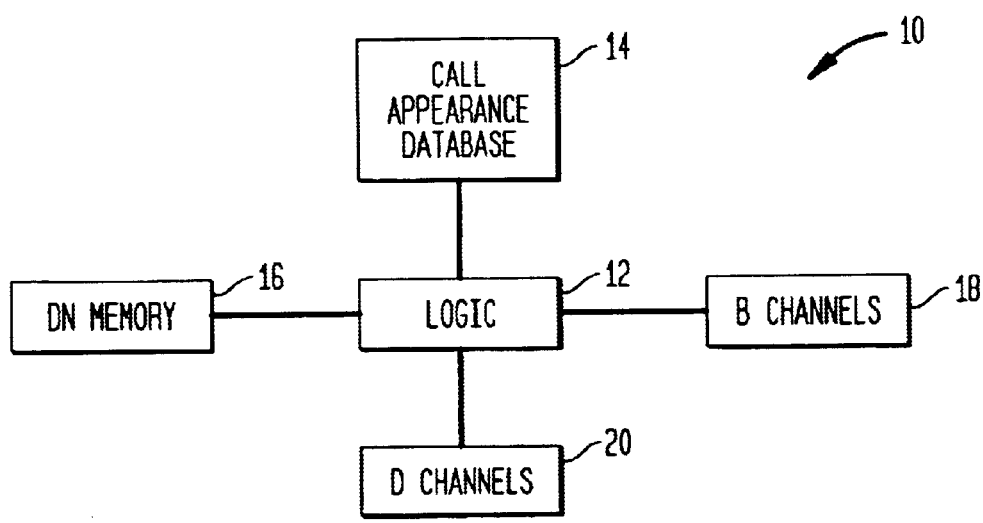
FIG. 3 is a high level block diagram illustrating an apparatus for performing the methods of the invention.

As mentioned above, the presently preferred embodiment of the invention is embodied as software or firmware in the Siemens Hicom 150 PBX device. However, it will be appreciated that the methods of the invention can be embodied in any TE coupled to a BRI. FIG. 3 illustrates a generic hardware embodiment of the invention.

Referring now to FIG. 3, the apparatus 10 includes a logic unit 12 which is coupled to a call appearance database 14, a directory number memory 16, the BRI B channels 18, and the BRI D channel(s) 20. The logic causes the B channels to call one another using the PDN data provided in the DN memory and monitors the D channel to collect call appearance data which is stored in the database.

Those skilled in the art will appreciate that the database 14 and the memory 16 may be the same memory device and that the CA data collected in the database may be forwarded to another part of the TE for appropriate use. It will also be appreciated that the logic may be embodied as a processor with associated program memory, as an Application Specific Integrated Circuit (ASIC), as a Field Programmable Gate Array (FPGA), as a state machine, or any other appropriate device for carrying out the methods of the invention.

Figure 4:
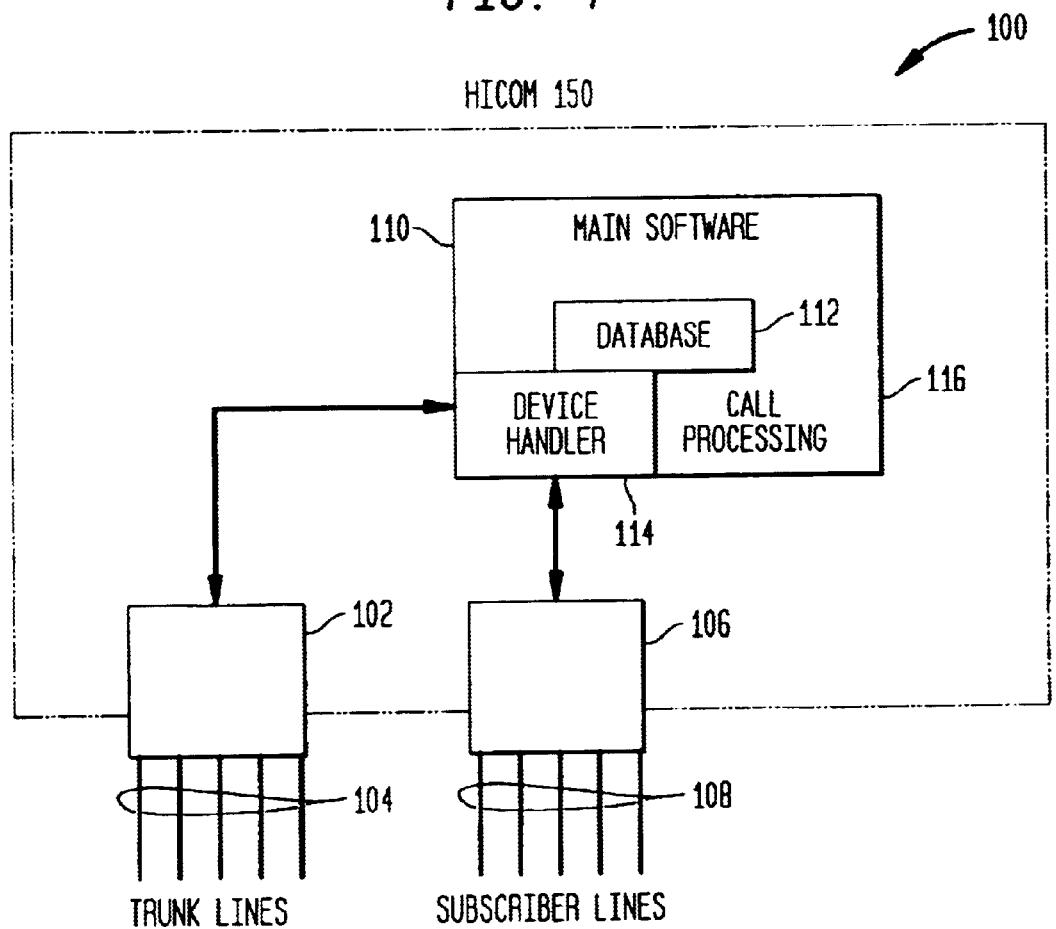
FIG. 4 is a high level block diagram of a PBX switch incorporating the methods of the invention.

Referring now to FIG. 4, a PBX switch 100 according to the invention is a modified Siemens Hicom 150. The switch 100 includes a plurality of trunk cards 102, each being coupled to a plurality of ISDN BRI trunk lines 104, and plurality of subscriber line boards 106, each being coupled to a plurality of subscriber lines 108.

The switch is operated by main software 110 which includes a data base 112, a device handler 114, and a call processing switching unit 116. As mentioned above, all the hardware and low level software functionality needed to implement the inventive method is already available in the Hicom 150 via existent function calls or via defined mailbox messages at Device Handler, Database or Loadware level. The new procedure is preferably located at Device Handler 114 and is activated when the trunk boards start-up is finished, layer 1 and layer 2 are up, TEI and SPID handling are successfully accomplished.

As mentioned above, the methods of the invention requires only the use of standard network protocol procedures needed for standard call processing. This means that the method is not dependent of supplementary BRI services being offered by the central office that support terminal parameter downloading. Thus, the method can be implemented in any existing or planned telephone equipment with no hardware and small software enhancement effort. The method is able to provide the Call Appearance values for BRI trunks supported by the telephone equipment, independent of the central office to which the customer's premises is connected.

Those skilled in the art will appreciate that the methods of the invention can be combined with known methods for determining the SPID of BRI trunks to create a stand-alone test gear to identify BRI characteristics. However, the primary intention of the invention is to provide a means whereby telephone equipment coupled to one or more BRIs can be quickly self-configured without the aid of a technician.

There have been described and illustrated herein methods and apparatus for automatically identifying call appearance values in an ISDN BRI. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method for automatically configuring call appearance values from message exchanges over a D channel in an ISDN BRI circuit, said method comprising:

(a) generating a first call from a first Primary Directory Number (PDN) to a second PDN in the same BRI circuit;

(b) monitoring the message exchange on the D channel for first Call Appearance information for said first PDN;

(c) obtaining said first Call Appearance information for said first PDN from the D channel; and (d) configuring said first PDN with said first Call Appearance information.

2. A method according to claim 1 further comprising the steps of:

(e) putting the first call on hold;

(f) generating a second call from said first PDN to said second PDN in the same BRI circuit; and (g) monitoring the message exchange on the D channel for second Call Appearance information for said first PDN;

(h) obtaining said second Call Appearance information for said first PDN from the D channel; and (i) configuring said first PDN with said second Call Appearance information.

3. A method according to claim 2 further comprising the step of repeating the steps of putting an ongoing call on hold, generating another call, and monitoring the D channel, obtaining corresponding Call Appearance information associated with said another call from said D channel and configuring said first PDN with said Call Appearance information associated with said another call until the generated call results in a busy signal.

4. A method according to claim 3 further comprising the step of repeating the steps of the method recited in claim 5 with calls being generated from said second PDN to said first PDN.

5. An apparatus for automatically configuring call appearance values from message exchanges over a D channel in an ISDN BRI circuit, said apparatus comprising:

(a) dialing means for generating a first call from a first Primary Directory Number (PDN) to a second PDN in the same BRI circuit;

(b) monitoring means for monitoring the message exchange on the D channel for first Call Appearance information for said first PDN;

(c) capture means for obtaining said first Call Appearance information for said first PDN from the D channel; and (d) configuring means for configuring said first PDN with said first Call Appearance information.

6. An apparatus according to claim 5 further comprising:

(e) holding means for putting the first call on hold;

(f) repeating means coupled to said dialing means and said monitoring means, wherein upon putting the first call on hold, the repeating means causes the dialing means to generate a second call from said first PDN to said second PDN in the same BRI circuit, and causes the monitoring means to monitor the message exchange on the D channel for a second Call Appearance information for said first PDN;

(g) capture means coupled to said repeating means for obtaining said second Call Appearance information for said first PDN from the D channel; and (h) configuring means for configuring said first PDN with said second Call Appearance information.

7. An apparatus according to claim 6 wherein said repeating means causes said holding means, said dialing means and said monitoring means to repeat the steps of putting an ongoing call on hold, generating another call, monitoring the D channel, obtaining corresponding Call Appearance information associated with said another call from the D channel and configuring said first PDN with said Call Appearance information associated with said another call until the generated call results in a busy signal.

8. An apparatus according to claim 7 wherein said repeating means causes said dialing means, said holding means, and said monitoring means, said capture means and said configuring means to repeat the steps of claim 9 with calls being generated from said second PDN to said first PDN.

9. An apparatus according to claim 5 wherein said apparatus is embodied in a microprocessor with an associated software program.

10. An apparatus according to claim 5 wherein said apparatus is embodied in a field programmable gate array.

11. An apparatus according to claim 5 wherein said apparatus is embodied in an application specific integrated circuit.

12. An apparatus according to claim 5 wherein said apparatus is embodied in firmware in a PBX switch.

13. An apparatus according to claim 5 wherein said apparatus is embodied in stand alone test equipment.

14. An apparatus according to claim 5 wherein said apparatus is embodied in a stand alone device adapted to be coupled to an ISDN BRI.

15. A self-configuring device for coupling to an ISDN BRI circuit and for automatically configuring Call Appearance values from message exchanges over a D channel in the ISDN BRI circuit, said device comprising:

(a) dialing means for generating a first call from a first Primary Directory Number (PDN) to a second PDN in the same BRI circuit;

(b) monitoring means for monitoring the message exchange on the D channel for first Call Appearance information for said first PDN; and (c) configuration means for configuring said first PDN with said first Call Appearance information.

16. A device according to claim 15 further comprising:

(d) capture means for obtaining said first Call Appearance information from the D channel.

17. The method according to claim 1 further comprising the step of repeating the steps of the method recited in claim 1 with calls being generated from said second PDN to said first PDN.

18. The method according to claim 2 further comprising the step of repeating the steps of the method recited in claim 2 with calls being generated from said second PDN to said first PDN.

19. The apparatus according to claim 5 wherein said repeating means causes said dialing means, said holding means and said monitoring means to repeat the steps of claim 7 with calls being generated from said second PDN to said first PDN.

20. The apparatus according to claim wherein said repeating means causes said dialing means, said holding means, said monitoring means, said capture means and said configuring means to repeat the steps of claim 9 with calls being generated from said second PDN to said first PDN.

\* \* \* \* \*